United States Patent [19]

Baldwin

[11] Patent Number: 5,984,513
[45] Date of Patent: Nov. 16, 1999

[54] VERY LOW CURRENT MICROCONTROLLER OPERATED MOTION SENSOR

[75] Inventor: John R. Baldwin, Newtown, Conn.

[73] Assignee: Hubbell Incorporated, Orange, Calif.

[21] Appl. No.: 08/887,650

[22] Filed: Jul. 3, 1997

[51] Int. Cl.$^6$ ................................................ H01H 35/00
[52] U.S. Cl. .............................. 364/528.21; 364/528.3; 307/116; 361/179
[58] Field of Search .............................. 364/140, 528.21, 364/188, 145, 146, 528.3, 528.32; 307/116, 154, 139; 365/179

[56] References Cited

U.S. PATENT DOCUMENTS

| | | | |
|---|---|---|---|
| 4,340,826 | 7/1982 | Muchnick | 307/157 |
| 4,874,962 | 10/1989 | Hermans | 307/116 |
| 5,221,919 | 6/1993 | Hermans | 340/567 |
| 5,538,181 | 7/1996 | Simmons et al. | 236/51 |
| 5,699,243 | 12/1997 | Eckel et al. | 364/140 |
| B1 4,874,962 | 4/1995 | Hermans | 307/116 |

*Primary Examiner*—Paul P. Gordon
*Attorney, Agent, or Firm*—Jerry M. Presson; William C. Roch

[57] ABSTRACT

A multivoltage (120 VAC to 277 VAC) input, low leakage current type, microcontroller-based, wall switch mounted, IR motion sensor with a latching relay having zero watt load switching capability, provided in a low cost, single PC board design to be mounted in a single gang electrical box. The switching circuit delivers AC electrical power to a load, such as a lighting fixture, from an AC power supply having only a hot lead, a neutral lead and a ground connection. The switching circuit comprises a rectifier, coupled to conduct a leakage current between the hot lead and the ground connection, for converting the AC electrical power to a DC electrical power supply. A relay has a first normally open contact coupled to the hot lead and a second normally open contact coupled to the load, and is powered by a storage capacitor. An IR occupancy sensor generates a signal in response to a detected human presence. A digital microcontroller is coupled to the DC electrical power supply, the relay, and the occupancy sensor, and controls operation of the relay to selectively deliver electrical power to the load. The switching circuit also includes a power monitor section, a power reset section, a power relay section for operating the relay switch, an LED flash section, and a timer section.

22 Claims, 5 Drawing Sheets

VERY LOW CURRENT MICROCONTROLLER OPERATED MOTION SENSOR

BACKGROUND OF THE INVENTION

1. Field of the Invention

The present invention relates generally to a very low current, microcontroller operated, wall switch or ceiling mounted, IR motion sensor. More particularly, the subject invention pertains to a multivoltage (120 VAC to 277 VAC) input, low current (leakage current type), microcontroller-based, wall switch or ceiling mounted, IR motion sensor with a latching relay having zero watt load switching capability, provided in a low cost, single PC board design.

In existing lighting systems and also in heating, ventilation, and air conditioning (HVAC) systems, the circuits powering these systems are commonly controlled by wall switches placed in easily accessible locations, such as adjacent to doorways, and the like. Institutions, businesses, offices, and commercial establishments have found that a great deal of power is consumed to light and ventilate rooms and areas which are often unoccupied for relatively long periods of time. Thus it is preferred for energy conservation reasons as well as security purposes that these energy consuming systems be turned on automatically when a room is entered and be turned off a short period of time after a room is completely vacated. To fill this need, occupancy sensors utilizing infrared sensors, ultrasonic sensors, ambient noise sensors, infrared sensors, and the like have been developed in the prior art to detect a human presence in a room and to switch on and off the relatively large loads of the lighting and HVAC circuits.

Frequently, a typical wall light switch receptacle box has been converted for the installation of an occupancy sensor. However, it should be noted that generally only two wires are fed into a typical wall switch box, the hot line wire from the utility power supply to the switch, and the load line wire extending from the switch to the load. Generally, the other side of the load is connected directly to the neutral line wire of the AC power supply without returning to the switch box. Thus the switch box is provided with a hot line to supply the occupancy sensor, but there is no neutral line to connect to the sensor to complete the circuit to the sensor. Extending a third wire from AC neutral to the wall box is an extremely costly and time consuming task, due to the fact that wall and/or ceiling surfaces will frequently need to be breached and reclosed in non-conduit systems, or the wire may need to be pulled through an existing conduit.

In this setting, a conventional circuit employing a voltage transformer and switching relay cannot be utilized, due to the fact that a transformer requires a connection between the hot and neutral lines of the AC utility power supply. A relay for load switching can be used in conjunction with a current transformer to supply circuit power when the load is on and a capacitive coupling circuit can supply circuit power when the load is off. This is costly and takes up considerable space. Another common type of switching system that might be used is an electronic switching circuit comprised of a triac and/or diac device. However, such triac and diac devices create electronic noise and also generate radio frequency interference which can be detrimental to sensitive communications and computer equipment now used in many office and commercial buildings. In addition, these devices are unstable due to the presence of surge currents and voltages as high as 10,000 volts which can occur in electrical systems. These surges can destroy such triac and diac devices. Furthermore, these devices are constantly drawing current and creating heat when the load is switched on. Many consumers are not favorably disposed towards an electrical system which maintains the wall switch box in a state of perpetual heating that is clearly palpable to the touch.

2. Discussion of the Prior Art

Hermans U.S. Pat. No. 4,874,962 discloses an electrical load switching system that is adapted to be used in existing (or new) electrical lighting and HVAC systems without requiring a connection to the neutral line of the AC utility power system. A salient feature of the Hermans system is that it is powered by a connection between the hot leg of the AC utility power supply and the electrical ground which is connected to the wall switch box itself.

The low power switching circuit of Hermans includes a rectifier network connected between the hot leg of the AC utility supply and the ground of the utility supply. A neon lamp and resistors interposed in the rectifier supply limits the current drawn through the rectifier to less than the 500 $\mu$a building code and UL limit for current flow to ground. A high sensitivity, dual coil, bistable relay is connected between the hot leg of the AC supply and the load, which is connected to the neutral leg of the AC supply. A capacitor network is connected to the DC output of the rectifier to store sufficient electrical power to operate the relay and a transistor switching network which is connected to deliver power from the capacitor network to the relay upon receipt of a trigger signal. A smart switch such as an area occupancy sensor is connected to the transistor switching network to provide the trigger signal to cause the relay to switch AC power to the load.

SUMMARY OF THE INVENTION

A primary object of the present invention is to provide a very low current, microcontroller operated, wall switch or ceiling mounted motion sensor.

A further object of the subject invention is the provision of a multivoltage (120 VAC to 277 VAC) input, low current (leakage current type), microcontroller-based, wall switch or ceiling mounted, IR motion sensor with a latching relay having zero watt load switching capability, provided in a low cost, single PC board design.

In accordance with the teachings herein, the present invention provides a low power, low leakage current type switching circuit for delivering AC electrical power to a load from an AC power supply having only a hot lead, a neutral lead and a ground connection. The switching circuit comprises a rectifier, coupled to conduct a leakage current between the hot lead and the ground connection, for converting the AC electrical power to a DC electrical power supply. A relay has first and second normally open contacts, with the first normally open contact coupled to the hot lead and the second normally open contact coupled to the load. A storage capacitor is also coupled to the DC electrical power supply, for storing electrical power to actuate the relay. An occupancy sensor is also coupled to the DC electrical power supply, for generating a signal in response to a detected human presence. A digital microcontroller is coupled to the DC electrical power supply, the relay, and the occupancy sensor, and controls operation of the relay to selectively deliver electrical power to the load.

In greater detail, only a single printed circuit board mounts the rectifier, relay storage capacitor, occupancy sensor, digital microcontroller, and other electrical components associated therewith. The single printed circuit board is mounted in a wall light switch receptacle box for a room. The occupancy sensor detects a human presence in the room, and the digital microcontroller controls the delivery of electrical power to a lighting fixture in the room.

A current limiter restricts current flow through the rectifier to less than 500 microamps, and the switching circuit is designed to be connected to an AC electrical power source of either 120 VAC or 277 VAC. The microcontroller is operated at a very low clock frequency of approximately 32 to 33 kilohertz.

First and second potentiometers store data for the microcontroller by their resistance settings, thereby eliminating a requirement for an EEPROM to retain stored information during power outages. The first and second potentiometers store data respectively on a desired illumination light level for the room, and on a time duration between detected movements in the room by the occupancy sensor.

The relay comprises a low power bistable latching relay having a set coil and a reset coil. A first storage capacitor is provided for storing electrical power for operating the set coil, and a second storage capacitor is provided for storing electrical power for operating the reset coil. Each of the set and reset coils includes a relay drive operating circuit with an insulated gate field effect transistor. Each relay drive operating circuit includes a local ground for the relay coil drive, the current through which does not contribute to the leakage current from the hot lead to the ground connection at the AC electrical power input.

A light emitting diode is flashed each time the occupancy sensor detects a human presence in the room. A storage capacitor stores electrical energy for flashing the light emitting diode, and an operating circuit therefor includes an insulated gate field effect transistor. The operating current for flashing the light emitting diode flows through a local ground, the current through which does not contribute to the leakage current from the hot lead to the ground connection at the AC electrical power input.

A photocell is provided for detecting the ambient light level in the room, and the microcontroller program inhibits energizing the lighting fixture when the photocell output indicates that the ambient light level in the room is above a set illumination level. The photocell exhibits a variable resistance in response to different illumination levels, and is coupled to a resistor in a first voltage divider circuit. A potentiometer stores data on the set illumination level for the room and is coupled to a resistor in a second voltage divider circuit. A comparator compares the voltage outputs of the first and second voltage divider circuits, and the comparator output is directed to the microcontroller. The input voltage ranges to the comparator are maintained under one volt to maintain the photocell voltage divider current under 15 microamperes, which occurs under a maximum ambient light level condition.

The occupancy sensor output signal is processed through an analog circuit which defines a window, having a minimum signal threshold and a maximum signal threshold, within which the output signal must pass to detect a human presence. The microcontroller program inhibits all signals from the analog circuit window detector for a fixed time period after the relay contacts to the load are opened to prevent triggering of the analog circuit as a result of transients produced thereby. The fixed time period is in the range of one or two seconds, to be short enough to be inconsequential to affect operation of the switching circuit and yet to be long enough to ensure that the transients have had time to dissipate to a level within the window thresholds.

A line voltage measuring circuit is also provided for continually monitoring the available AC power line voltage. When a loss of AC line voltage is detected thereby, the microcontroller program sets the relay while sufficient energy remains in the storage capacitor, such that when the AC line voltage is restored, the lighting fixture is turned on. After a loss of AC line voltage, the microcontroller continues to periodically check the line voltage measuring circuit for continued loss of AC line voltage, and also clears delay timer registers to zero.

The relay drive signal time durations are set to a value to assure proper relay energization and also to deplete the storage capacitor voltage to a level where transients generated during turning off of the relay do not have a deleterious effect on the switching circuit. The time duration of the relay drive signals are in the range of 15 to 25 milliseconds.

A selector switch has a first ON position in which current is supplied from the hot lead to the load, an OFF position in which no current is supplied from the hot lead to the load, and an AUTO position in which the first and second normally open contacts are closed under control of the microcontroller to supply current from the hot lead to the load.

BRIEF DESCRIPTION OF THE DRAWINGS

The foregoing objects and advantages of the present invention for a very low current microcontroller operated motion sensor may be more readily understood by one skilled in the art with reference being had to the following detailed description of a preferred embodiment thereof, taken in conjunction with the acompanying drawings wherein like elements are designated by identical reference numerals throughout the several views, and in which.

DETAILED DESCRIPTION OF THE DRAWINGS

Figure 1A:
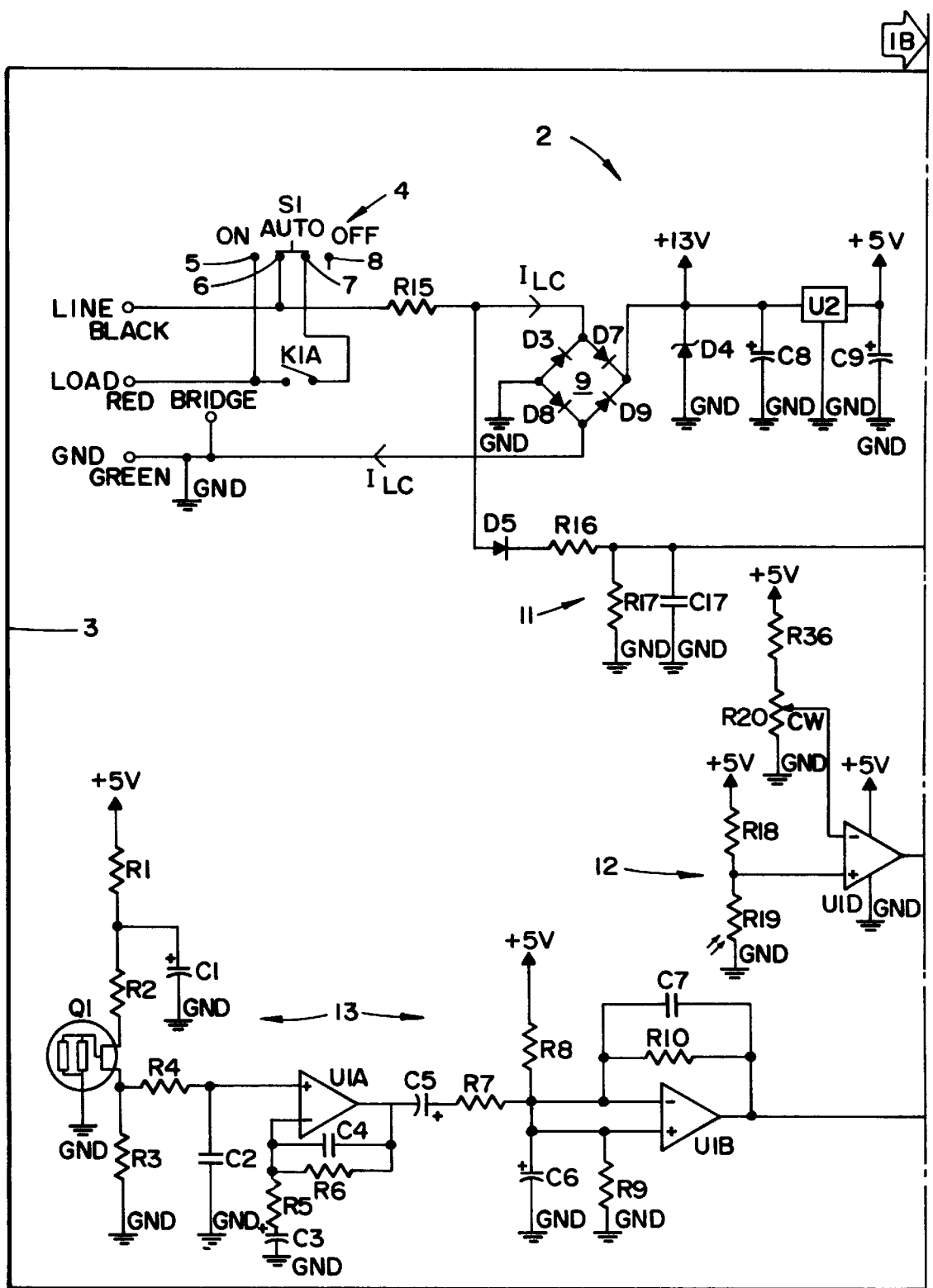
FIGS. 1A and 1B are an electrical schematic of an exemplary embodiment of a very low current, microcontroller operated, wall switch mounted, PIR motion sensor circuit which is designed to be mounted on a single PC board.

The present invention provides a dual voltage (120 VAC or 277 VAC) input, low cost, single PC board, microcontroller based wall switch IR motion sensor. The particular challenge of designing such a sensor is to make it dual voltage and low current (leakage current type) with a latching relay providing zero watt load switching capability. A microcontroller based sensor design uses a very low cost, standard, off-the-shelf microcontroller (Microchip PIC16C54) to provide all of the required features contained on a single PC board. The leakage current type of design limits permissible current drain to 500 microamperes. The sensor must work at both 120 VAC and 277 VAC, and will operate at all voltages inbetween. The design accomplishes this and incorporates two additional features, ON-AUTO-OFF user switching of the line voltage, and ambient light level monitoring with an inhibit of load switching when ambient light level is above a user set threshold. All of these features are provided while keeping the average current drain for the sensor below the 215 microamperes which is available at the lower line voltage. To meet all of these requirements:

1. The microcontroller is operated at a very low clock frequency (32.768 Khz).

2. The typical requirement for an EEPROM to retain stored information during power outages is eliminated, and this function is achieved by storing ambient light level information and a time duration between detected movements in a room in potentiometer settings, thus eliminating the current drain and cost of an EEPROM.

3. A low current drain circuit is used to operate the latching relay which uses an Insulated Gate, Field Effect Transistor (IGFET). This approach basically eliminates junction transistor base current and microcontroller I/O current.

4. A unique hardware/software design permits user friendly photocell adjustments. To maintain a photocell divider current of 15 microamperes maximum, which occurs under maximum ambient light conditions, and also to use a low cost photocell, the design achieves a large range of potentiometer adjustments in conjunction with only 0.0 volts to 0.6 volts (12%) of the input voltage range to a comparator circuit. The software looks for a high comparator output to signify an ambient light level less than the threshold set by the end user.

5. A very simple (low parts count) and very low current drain circuit is used to flash the red walk test LED. Junction transistor base current and microcontroller I/O current are basically eliminated by the use of an Insulated Gate, Field Effect Transistor (IGFET). A small 4.7 uF capacitor is charged through a 220KΩ resistor. Essentially 100% of the capacitor charge is discharged through the LED and contributes to the flash when walk testing the unit. The duration of the flash is 10 msec and is software controlled; this time was established empirically as an optimal balance between minimizing the current required to charge the 4.7 uF capacitor in a short time and also not reducing the intensity of the visually perceived flash.

6. A regulator (C78L05CZ) was selected for its low cost and low quiescent current drain, but the maximum input voltage it can handle is only 14 volts. Thus the power supply for the capacitors which operate the relay coils is designed to operate at a lower voltage. To meet this criterion, the physical size of these capacitors was minimized, and a 13 volt power supply was selected.

7. The MLCR (reset) circuit is designed to minimize current drain.

Additional aspects of the design are as follows:

1. Retriggering of the sensitive analog circuitry often occurs in energy management sensors as a result of transients produced when the relay contacts open the load circuit. The degree of the problem varies depending upon the lighting circuit/load, the type of ballast(s) used, and the design of the sensor electronics. A software solution was designed for this horrendous transient problem. The software inhibits all signals from the analog circuit window detector for a fixed time period. An optimal time of 1.5 seconds was selected as a balance between being short enough to be inconsequential to the end user and being long enough to ensure that the worst of retriggering transients from a whole host of ballast manufacturers have time to dissipate to a level well within the window detector thresholds.

2. A line voltage measuring circuit continually monitors the available AC line voltage. When this circuit detects a loss of line voltage, it directs the software to run a special code which sets the relay while sufficient energy remains in the power supplying storage capacitor, and continues to check once every 1.5 seconds for continued loss of line voltage. The special code also clears (sets to zero) the delay timer registers and sets up the delay timer software. Hence, if the line voltage loss is due to a sag in line voltage or a brown-out, which does not result in resetting of the microcontroller via its master clear pin, after the line voltage monitor detects the restoration of line voltage, normal operation is restored; the user set Delay Time will begin and the relay will be set for the Delay Time. Thus the circuit assures that anyone in the motion sensor controlled area will not be in the dark when power is restored after a power outage.

3. Relay coil suppressor diodes are eliminated by balancing the relay set and reset coil drive signal time durations to optimal values which assure proper relay energization and at the same time deplete the energy storage capacitor voltage to a level where the coil turn-off transients do not have a deleterious effect on the circuit components.

4. A slide switch (3 pole double throw switch) is used to switch line voltage while providing override ON and override OFF capability in addition to the automatic sensor mode of operation. In order to increase the switching capacity of the sensor, a double pole switch is used and the respective contacts of the two poles connected together on the PC board, thereby increasing the switching capability of the sensor and allowing a higher specified rating for the sensor.

Figure 1B:
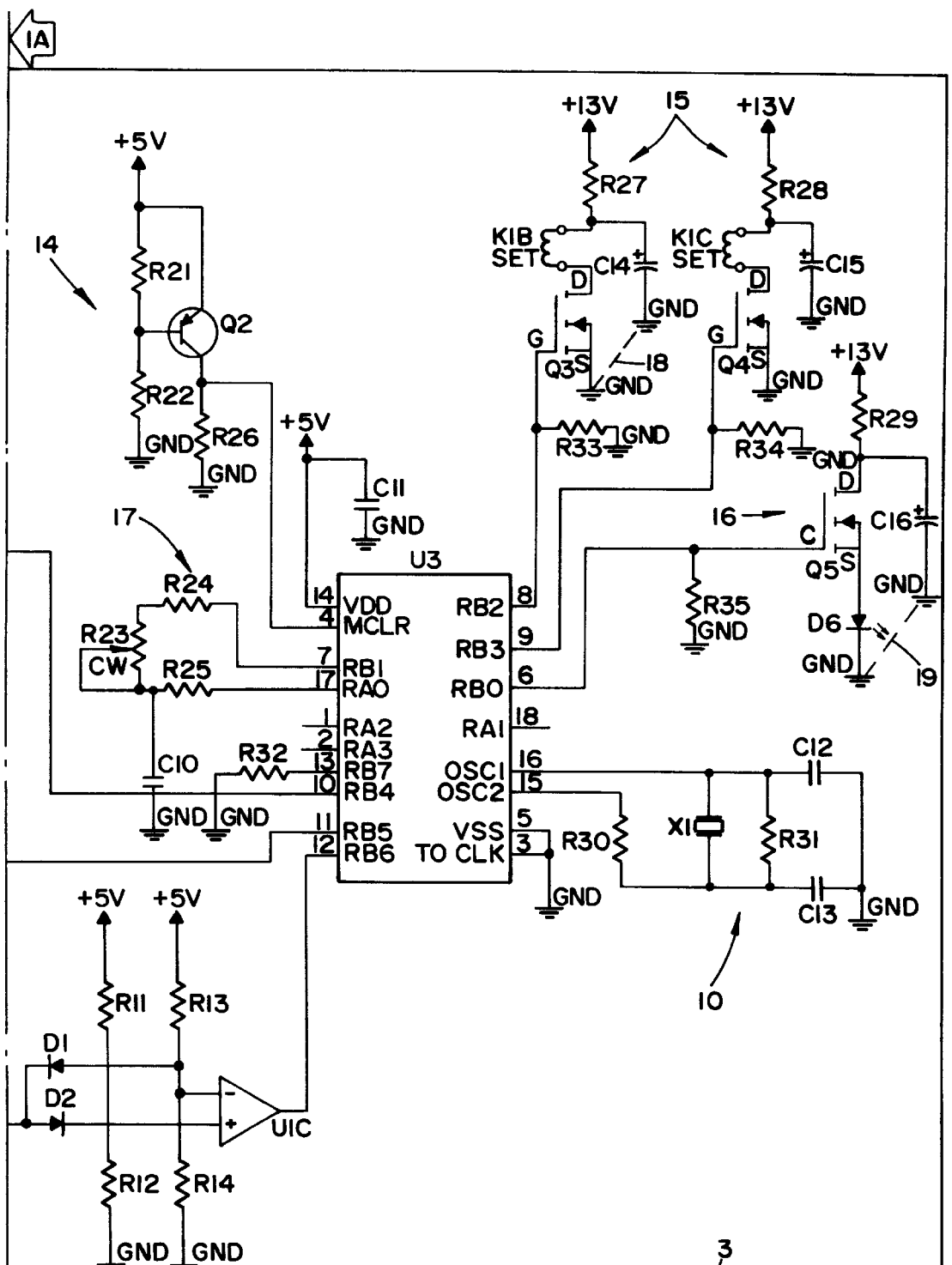

FIG. 1 is an electrical schematic of an exemplary embodiment of a very low current, microcontroller operated, wall switch mounted, motion sensor circuit 2 which is designed to be mounted on a single PC board 3 installed in a single gang electrical box. A normal utility electrical line extending to a wall switch receptacle box includes a black hot line wire, a red load wire and a green ground wire. A switch 4 has a first ON position in which contacts 5 and 6 are closed to supply current from the line to the load, an OFF position in which contacts 7 and 8 are closed and no current is supplied from the line to the load, and an AUTO position in which contacts 6 and 7 are closed to supply current from the line to the load through a relay operated switch KIA, which is operated by the very low current microcontroller wall switch motion sensor of the present invention.

A 3 pole double throw slide switch 4 is used in order to increase the switching capacity of the sensor, and the respective contacts of the two poles connected together on the PC board 3, thereby increasing the switching capability of the sensor and allowing a higher specified rating for the sensor.

The line voltage, which can be either 120 VAC or 277 VAV, supplies a leakage current $I_{LC}$ through R15 (560 ohms) through a full wave rectifier circuit 9 to ground, and this leakage current $I_{LC}$ must be limited to less than 500 $\mu$amps to comply with construction codes and UL regulations. At the higher voltage of 277 VAC, and pursuant to ohms law V=IR, selecting R15 to be 560 ohms limits the leakage current $I_{LC}$ to 495 $\mu$amps.

The electrical voltage on the cathode of the rectifier is limited by zener diode D4 and accumulated in capacitor C8 to form a 13 V power supply for the circuit, which passes through voltage regulator U2 and is accumulated in capacitor C9 to form a 5 V power supply for the circuit. The regulator U2 (C78L05CZ) was selected for its low cost and low quiescent current drain.

In an overview, the circuit 2 also includes broadly a microcontroller (Microchip PIC16C54) U3, a crystal clock section 10, a power monitor section 11, an ambient light detection section 12, a pyro IR (PIR) motion or presence detector section 13, a power reset section 14, a power relay set and reset section 15 for operating relay switch KIA, an LED flash section 16, and a timer section 17. The term microcontroller has been used herein, and is deemed to cover equivalents such as a microprocessor, etc.

The frequency of the clock signals generated by the crystal (X1) clock section 10 is intentionally set at a very low clock frequency of approximately 32 Khz to minimize the electrical power consumed by the circuit.

The electrical power monitor section 11 monitors the AC line voltage, and if the line voltage drops, the microcontroller operates to set the relay before the power failure disables the circuit, such that when power comes back on, the lights in the room will be turned on. The power monitor section is coupled to the line voltage before the rectifier 9, and the AC voltage is rectified by D5 and limited by R16 to charge capacitor C17. In the event of a power failure, the parallel combination of C17 and R17 discharges faster than C8 in the power supply, and the lower voltage at the microcontroller input RB4 signals the power supply failure to the microcontroller. The power monitor section continually monitors the line voltage. When this circuit detects a loss of AC line voltage, it directs the microcontroller at input RB4 to run a special software code which sets the relay while sufficient energy remains in the storage capacitor C14, and continues to check once every 1.5 seconds for continued missing line voltage. The special code also clears (sets to zero) the delay time registers and sets up the delay timer software. Hence, if the line voltage loss is due to a sag in line voltage or a brown-out, which does not result in resetting of the microcontroller via its master clear pin (MCLR), after the line voltage monitor detects the restoration of line voltage, normal operation is restored; the user set Delay Time will begin and the relay will be set for the Delay Time. Thus, the circuit assures that anyone in the motion sensor controlled area will not be in the dark after the restoration of power following a power outage.

The ambient light section 12 includes a variable resistance photocell R19 arranged in a voltage divider circuit with resistor R18. A potentiometer R20, which sets the lighting illumination level in the room, is arranged in a voltage divider circuit with R36. A comparator U1D compares the two signals from the two voltage divider circuits, and signals the microcontroller at input RB5 when the detected ambient light sensed by R19 falls below the illumination setting of R20. The current drawn by this circuit is limited to less than 15 μamps, and the values of resistors R18, R19 and R36, R20 are selected to limit the two voltage inputs to U1D to between 0 and 0.6 V. To maintain a photocell divider current of 15 microamperes maximum, which occurs under maximum ambient light conditions, and also to use a low cost photocell R19, the design provides a large range of potentiometer adjustments in conjunction with only 0.0 volts to 0.6 volts (12%) of the input voltage range to a comparator circuit U1D. The software looks for a high comparator output to signify an ambient light level less than the threshold set by the end user.

As explained hereinbelow, the setting of a potentiometer R23 is also utilized to store a variable time period from 1 to 30 minutes, during which the microcontroller maintains the lights in a room on and then switches the lights off unless activity is sensed in the room by a PIR sensor Q1, in which case the time period is restarted.

The potentiometers R20 and R23 eliminate the typical requirement in the prior art for an EEPROM to retain stored information during power outages. This function is achieved by storing the ambient light level information and the time duration between detected movements in a room in the potentiometer settings, thus eliminating the current drain and cost of an EEPROM.

In circuit section 13, the output of the PIR motion or presence detector Q1 proceeds through a bandpass amplifier section consisting of U1A, U1B and their associated resistors and capacitors, the output of which proceeds through a window detector circuit consisting of U1C, diodes D1, D2 and resistors R11, R12, R13 and R14. If the input signals to the window detector circuit are outside the window defined by this circuit, then the microcontroller is signaled at input RB6 of the detected presence.

The power reset section 14 is designed to have the reset voltage as low as possible while being sufficiently high to enable the microcontroller to operate properly. This is because higher reset voltages result in larger start up current sorges (humps) when electrical power is restored. The voltage divider network R21, R22 is designed to turn Q2 on when the +5 V power supply drops to 2.8 V. Q2 signals the loss of electrical power to the microcontroller at input MCLR, which is the master clear reset to the microcontroller and is maintained low until the +5 V power supply rises above 2.8 V. The MCLR (reset) circuit is also designed to minimize current drain.

When the control switch 4 is in the AUTO position, electrical power to the lights is controlled through relay switch K1A, which the microcontroller controls by set relay coil K1B and reset relay coil K1C in section 15 of the circuit. The circuits to drive these relay coils are designed to draw as little leakage current $I_{LC}$ as possible, and are substantially identical. The set relay coil K1B is controlled by the microcontroller at output RB2, a high signal at which turns on an Insulated Gate Field Effect (IGFET) Q3 to drive coil K1B. Prior thereto, capacitor C14 has been charged slowly through R27 from the +13 V power supply. When IGFET Q3 is turned on, capacitor C14 powers the drive coil K1B through two ground (GND) connections. However, the ground connections are local grounds for the relay coil drive circuit, symbolized by dashed line 18, and are not a part of the green ground wire at the input to the circuit, and so do not contribute to the leakage current $I_{LC}$. The only contribution to the drive current $I_{LC}$ is when capacitor C14 charges through resistor R27, but this occurs over a relatively longer period of time to limit that charging current such that $I_{LC}$ does not exceed 500 μamps. The reset coil K1C drive circuit operates in a similar manner, controlled by the microcontroller at output RB3. The use of a low current drain circuit with an insulated gate, Field Effect Transistor (IGFET) to operate the latching relays basically eliminates junction transistor base current and microcontroller I/O current.

The regulator U2 (C78L05CZ) was selected for its low cost and low quiescent current drain, but the maximum input voltage it can handle is only 14 volts. Thus the power supply for the capacitors C14, C15 that operate the relay coils was designed to operate at a lower voltage. To meet this criterion. the physical size of these capacitors was minimized, and a 13 volt power supply was selected.

Relay coil suppressor diodes, as are frequently used in the prior art, are eliminated from the circuit by balancing the relay set and reset coil drive signal time durations to optimal values which assure proper relay energization and at the same time deplete the energy storage capacitor voltage to a level where the coil turn-off transients do not have a deleterious effect on the circuit components.

The LED D5 flash circuit in circuit section 16 also operates in a similar manner, controlled by the microcontroller at output RBO, and has a capacitor C16 charged through R29 from the +13 V power supply, which discharges through IGFET Q5, LED D5 and a local ground 19. This provides a very simple (low parts count) and very low current drain circuit to flash the red walk test LED. Junction transistor base current and microcontroller I/O current are basically eliminated by the use of an insulated gate, Field Effect Transistor (IGFET). A small 4.7 uF capacitor is charged through a 220 KΩ resistor, providing a 1.13 second or less time constant. Essentially 100% of the capacitor charge is discharged through the LED and contributes to the flash when walk testing the unit (wherein a person walks around the sensor to determine the sensing zones). The duration of the flash is 10 msec and is software controlled; this time was established empirically as an optimal balance between minimizing the current required to charge the 4.7 uF capacitor in a short time and also not reducing the intensity the perceived visibility of the flash. Moreover, the flash interval should be as short as possible.

In the timer section 17, a potentiometer R23 is utilized to store a variable time period from 1 to 30 minutes, during which the microcontroller maintains the lights in a room on and then switches the lights off unless activity is sensed in the room by the PIR sensor Q1, in which case the time period is restarted. Microcontroller output RB1 is normally maintained low in a discharge mode to discharge C10 and maintain it discharged, but is switched high in a charge mode to charge C10 during a Delay Time Measurement. This operates in association with microcontroller input/output RA0 which is configured as an output and is normally low to keep C10 discharged, but is configured as an input to permit C10 to charge during a Delay Time Measurement, which is in turn a measurement of the setting of R23, which determines the rate of charging of C10.

The following Table 1 gives the PIC16C54A microcontroller I/O definitions.

thereafter. During a warm up period, there is a software inhibit (hold low) of the SET RELAY and RESET RELAY signals for 90+/−3 seconds, i.e. until the relay capacitors are charged sufficiently to set and reset the relay. At the end of the warm up period the lights are turned on unconditionally. The MAIN label above step 28 and the PHOTO label above step 34 are labels that are referred to in the software code for the convenience of the programmer.

The following initial explanation proceeds through the logic flow diagrams as in a typical cycle of operation, and is then followed by explanations of other cycles of operation.

At decisional block 30, the presence of the AC line voltage is checked, and if present, step 32 checks if the timer flag is equal to 1, which indicates that the delay time indicated by potentiometer R23 is being counted down and has not expired. It normally has not, and the routine then proceeds to step 34 and the delay count subroutine, and then at step 36 increments the loop cycle counter, which measures the delay count once for every 64 times through the loop. At step 38, the loop cycle counter is checked, and if less than a count of 64, the routine exits the delay count subroutine at step 40. Step 42 checks that the window input is low, which indicates that the PIR detector has not sensed any movement. The microcontroller must check the window input at RB6 for high signals at least every 100 msec, which means that the program cycles and returns to step 42 in less than 100 msec. If the window input is low, the routine proceeds to step 44 wherein the timer flag is checked. If the timer flag is a 1, which indicates that the delay timer is running, the routine proceeds to step 46, wherein the window input is

TABLE 1

I. PIC16C54A Microcontroller I/O Definitions:

| | | |
|---|---|---|
| DISCHAEGE (RA0): | Output:<br>Input: | Normally Low = keeps C10 discharged<br>Configued as Input to permit C10 charge |
| RED (RB0): | Output Only: | Low = red walk test LED off<br>High = red walk test LED on |
| MEASURE (RB1): | Output Only: | Low = mode to discharge C10<br>High = charging C10 for Delay Time measurement |
| SET_RELAY (RB2): | Output Only: | High = drive relay SET coil; contacts close |
| RESET_RELAY (RB3): | Output Only: | High = drive relay RESET coil; contacts open |
| AC_LINE (RB4): | Input Only: | High = AC line voltage present<br>Low = AC line voltage missing |
| PHOTOCELL (RB5): | Input Only: | High = ambient light level below preset threshold.<br>Low = ambient light level above preset threshold results in software inhibit of WINDOW signal |
| WINDOW (RB6): | Input Only: | Low = No PIR trip signal<br>High = PIR trip signal |
| TEST_CODE (RB7): | Input Only: | Low = normal sensor operation<br>High = run self test code for functional ATE testing |
| RA1 | Unused | |
| RA2: | Unused | |
| RA3: | Unused | |

Figure 2:
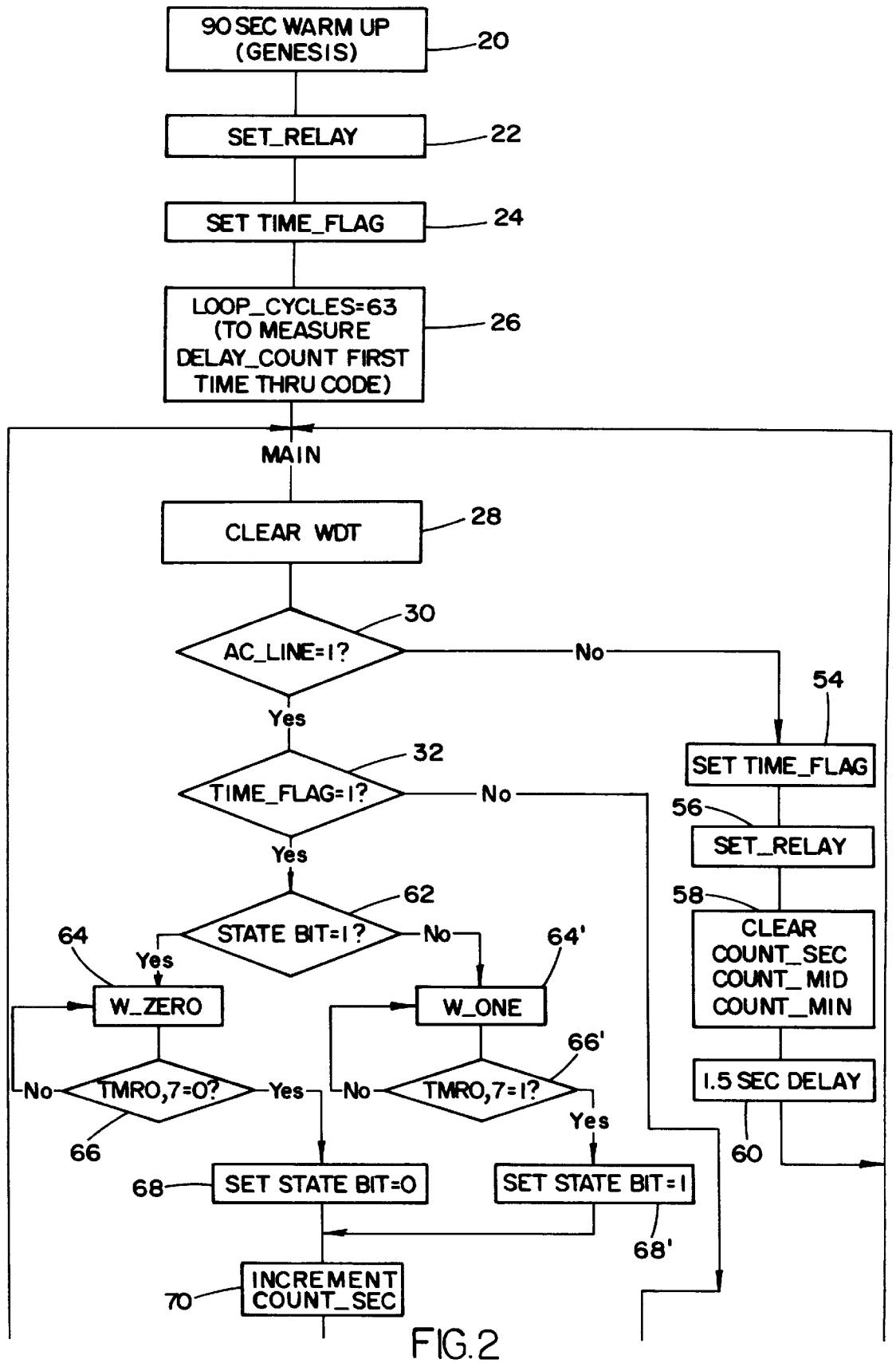
FIGS. 2, 3, and 4 are sequential logic flow diagrams showing an exemplary operating program for the microcontroller.
Figure 3:
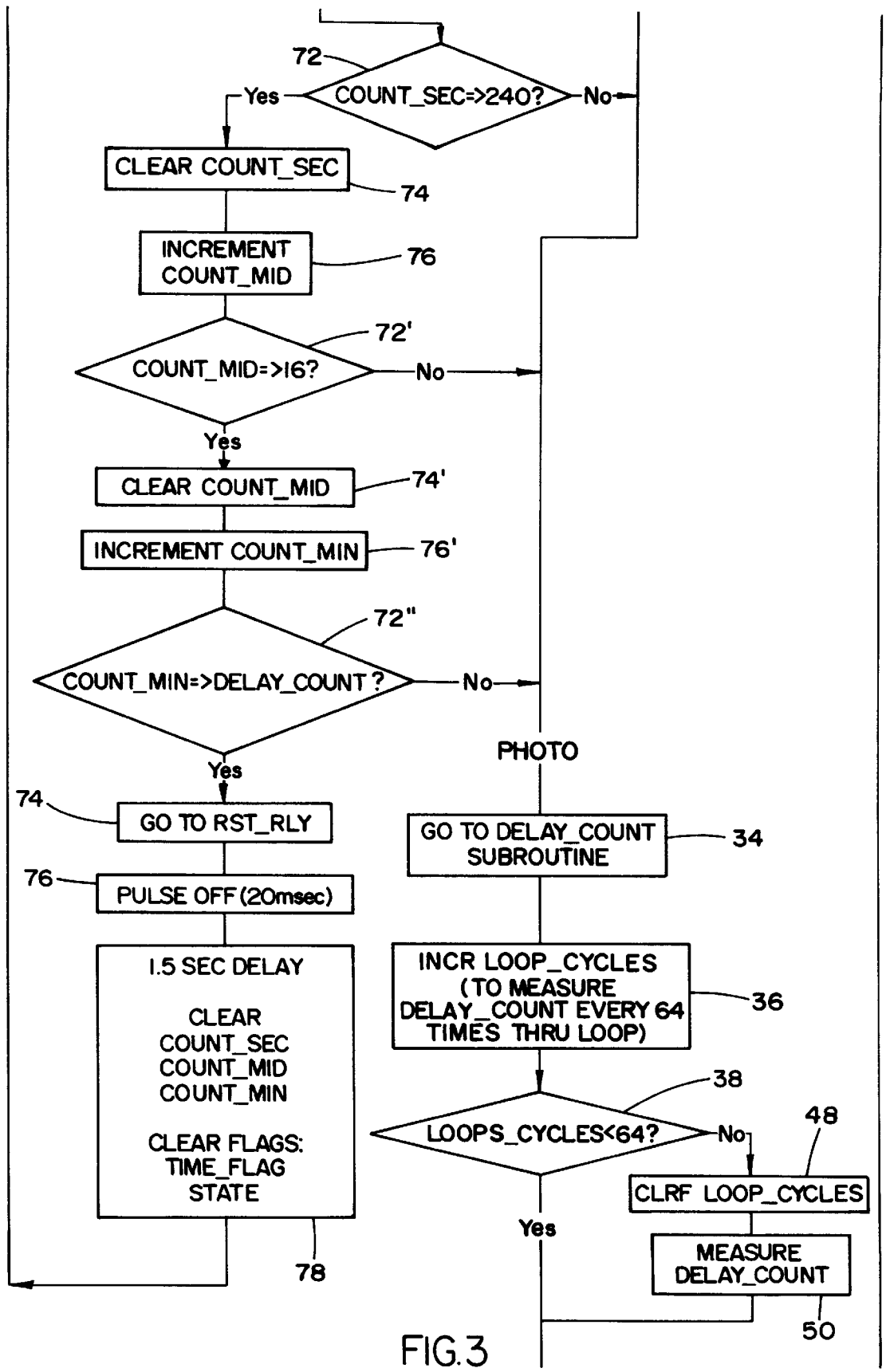
Figure 4:
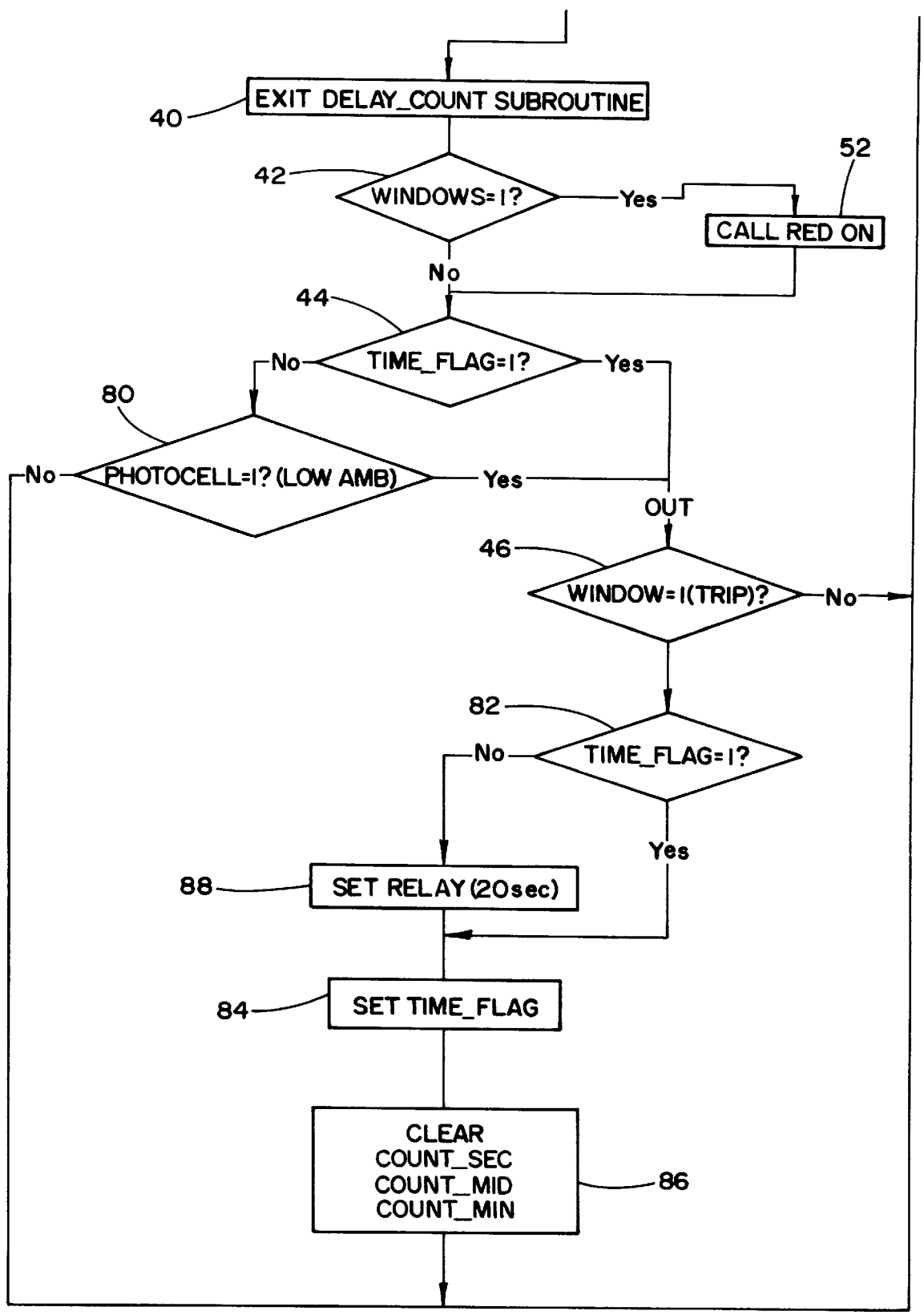

FIGS. 2 through 4 are sequential logic flow diagrams showing an exemplary operating program for the microcontroller. Starting at the top of FIG. 2, there are the following initialization steps. At step 20, allow a 90 second warm up period to allow all capacitors to charge and to raise the voltage levels to proper operating levels throughout the circuit. At respective steps 22, 24, 26 and 28, set the relay, set a timer flag, set loop cycles equal to 63, and clear a watchdog timer. The LOOP_CYCLES count is set to 63 in step 26, and on the first pass through the program this count will be incremented to a count of 64 in step 36, which means that the outcome of decisional step 38 is No. This means that the DELAY_COUNT will be measured at step 36 in the first pass through the program, and at every 64 loop cycles checked. If the window input is low, which indicates that the PIR detector has not been tripped, the routine proceeds back to step 28, and then proceeds down through the routine again.

Returning to the explanation of step 38, when the count of loop cycles reaches 64, the routine proceeds to step 48 to clear the loop counter and then to step 50 which is a subroutine to measure the DELAY_ COUNT, which is a count which is equivalent to the Delay Time setting of R23. The minimum potentiometer setting is equivalent to 1+/− 0.33 minutes. The maximum potentiometer setting is equivalent to 30+/−6 minutes, which is software limited on the high side to 32 minutes.

Returning to the explanation of step 42, when WINDOW=1, which indicates that the PIR detector has detected a presence in the room, the subroutine at 52 Red LED will flash for 10+/−1 msec, even if the PHOTOCELL is inhibiting the SET_RELAY signal.

Returning to the explanation of step 30, when AC_LINE is low, a power outage is indicated, and the routine proceeds to step 54 to set the timer flag, and then to step 56 to set the relay, to ensure that the lights are on when power returns, then to step 58 to clear the seconds, middle and minutes counters, and then to step 60 to introduce a 1.5 second delay, after which the routine returns to step 28. The routine continues cycling through this set of steps until either normal power is returned or the 5 volt power supply drops to 2.8 volts.

In the event of a brown-out or line voltage sag wherein the 13 volt supply drops momentarily to >2.8 volts, then: the relay contacts are closed unconditionally and immediately, before there is insufficient energy available in the power supply capacitor to set the relay contacts closed; the TIME_FLAG is set unconditionally; the counter (COUNT_SEC), (COUNT_MID) and (COUNT_MIN) are cleared unconditionally, then wait 1.5 seconds and recheck the line voltage for brown-out condition; repeat as long as the brown-out continues.

If power recovers before the 13 volt supply drops to a point where the output of the 5 V supply is <2.8 volts, then the Delay Time will permit the relay capacitors to recharge sufficiently for normal operation.

In the event of a brown-out wherein the 13 volt supply drops and the 5 V supply output falls momentarily to <2.8 volts, then:

the room may be either occupied or unoccupied;
there are no additional software requirements as the microcontroller is held in the RESET condition by a low input on the MCLR; when the MCLR input goes high it cause the 90+/−3 second warm-up software to inhibit the SET and RESET signals until the capacitors are sufficiently charged to set and reset the relay.

Returning to the explanation of step 32, when the TIME_FLAG is high, which indicates that a timeout period is being counted down as a consequence of a PIR detected presence in the room, then the routine proceeds to step 62, and then alternatively to steps 64, 66 and 68 or steps 64', 66' and 68', with the routine on subsequent passages alternately toggling between the two sets of steps. This is because if the state bit is initially high, the routine proceeds down steps 64 and 66 to step 68, wherein the state bit is set low, so that on the next passage the routine proceeds down steps 64' and 66' to step 68' wherein the state bit is set high, so that on the next passage the routine proceeds down the first set of steps, and etc. Steps 64 and 66 comprise a loop which continues to check bit 7 of free running clock timer, TMR0, until it changes to zero. This transition to zero occurs every 2×0.0156 seconds. The routine then proceeds to steps 68 and 70. A similar operation is carried out in steps 64', 66' and 68'.

The logic flow diagram at steps 62, 64, 66 and 68, and also at steps 64', 66' and 68' basically assures that the seconds count is incremented at step 70 on a per 0.0156 second basis.

At step 70, the seconds counter is incremented, and at step 72 if the seconds counter has not reached a count of 240, the routine proceeds to the right and keeps cycling through the routine until the seconds counter reaches a count of 240, when the routine proceeds to clear the seconds counter at step 74, and increments a middle counter at step 76, and then checks at step 72' if the middle counter has reached a count of 16. The operation in steps 72', 74' and 76' correspond generally to steps 72, 74 and 76, except for being for the middle counter, and at step 76' a minutes counter is incremented.

The minutes counter is then incremented in successive loops until at step 72" the count therein equals or exceeds the delay count, which was measured in step 50 and corresponds to the setting of potentiometer R23. At that point in the routine no motion has been detected (WINDOW=0) during the period of the full count (otherwise the count would have been restarted) and the Delay Time has ended (COUNT_MIN=DELAY_COUNT). Then at step 74 and 76 the lights are turned off (RESET_RELAY=high for 20+/−1 msec.) The next step 78 inhibits possible retrigger signals from being generated during and immediately after the 20 msec (RESET_RELAY) signal by maintaining the (RED), (SET_RELAY), (DISCHARGE) and (MEASURE) outputs in low states unconditionally for 1.5 seconds which includes the 20 msec RESET_RELAY time period. Step 78 also clears the seconds, middle and minutes counters and clears the timer and state flags.

Returning to the explanation at step 44, if the timer flag is low, it indicates that a time period is not being counted down, and the routine proceeds to step 80. If the PHOTOCELL (RB5) input is high it indicates that the ambient light level is below the preset threshold in potentiometer, and the routine then returns to step 46. A low input indicates that the ambient light level is above the preset threshold, which results in a software inhibit of the WINDOW signal. When the outcome of decisional step 80 is a No, this means that the ambient illumination as measured by R19 exceeds the illumination setting of R20, so that the lighting fixtures are not turned on by bypassing step 88.

Returning to the explanation at step 46, if WINDOW=1, which indicates a PIR trip signal, the routine proceeds to step 82. If the timer flag is set, which indicates a delay time is being counted down, the routine proceeds to step 84, wherein the timer flag is set, and then to step 86, wherein all of the timers are cleared to restart the delay time countdown.

If at step 82, the timer flag was not set, indicating a delay time was not being counted down, then at step 88 the set relay is actuated for 20 msec to turn the lights on, the timers are cleared to restart the delay time countdown.

The motion signal processing is summarized in the following Table 2.

TABLE 2

Definition: DELAY_COUNT is the count which is equivalent to the Delay Time setting of R23. Minimum potentiometer setting is equivalent to 1 +/− 0.33 minutes. Maximum potentiometer setting is equivalent to 30 +/− 6 minutes which is software limited on the high side to 32 minutes.
If WINDOW = 1, the Red LED will flash for 10 +/− 1 msec, even if the PHOTOCELL is inhibiting the SET_RELAY signal.

TABLE 2-continued

| 1.) | If: | Motion detected, room natural light level below photocell threshold (PHOTOCELL = 1), and no Delay Time is in process (COUNT_SEC = 0), (COUNT_MID = 0), (COUNT_MIN = 0), |
|---|---|---|
| | Then: | Turn the lights on (SET_RELAY = 1 for 20 +/− 1 msec) and read Delay Time potentiometer (DELAY_COUNT). |
| 2.) | If: | Lights are on (DELAY_COUNT > 0) and motion has been detected (WINDOW = 1) and room natural light level above or below photocell threshold (PHOTOCELL = 1 or 0), |
| | Then: | Reset Delay Time. Clear (COUNT_SEC) and (COUNT_MID) and (COUNT_MIN). |
| 3.) | If: | No motion has been detected (WINDOW = 0) and the Delay Time has ended (COUNT_MIN = DELAY_COUNT), |
| | Then: | a.) Turn the lights off (RESET_RELAY = high for 20 +/− 1 msec). |
| | | b.) Inhibit possible retrigger signals generated during and immediately after the 20 msec (RESET_RELAY) signal. (RED), (SET_RELAY), (DISCHARGE) and (MEASURE) remain low outputs, unconditionally, for 1.5 seconds which include the 20 msec RESET_RELAY time period. |

While several embodiments and variations of the present invention for a very low current microcontroller operated motion sensor are described in detail herein, it should be apparent that the disclosure and teachings of the present invention will suggest many alternative designs to those skilled in the art.

What is claimed is:

1. A low power, low leakage current type switching circuit for delivering AC electrical power to a load from an AC power supply having only a hot lead, a neutral lead and a ground connection, comprising:

a. a rectifier means, coupled to conduct a leakage current between the hot lead and the ground connection, for converting the AC electrical power to a DC electrical power supply;

b. a relay means having first and second normally open contacts, with the first normally open contact being coupled to the hot lead and the second normally open contact being coupled to the load, and a storage capacitor means, coupled to the DC electrical power supply, for storing electrical power to actuate the relay means;

c. an occupancy sensor means, coupled to the DC electrical power supply, for generating a signal in response to a detected human presence;

d. a digital microcontroller means, coupled to the DC electrical power supply, the relay means and the occupancy sensor, for controlling operation of the relay means to selectively deliver electrical power to the load.

2. A low power leakage current type switching circuit as claimed in claim 1, further comprising only a single printed circuit board for mounting the rectifier means, relay means, storage capacitor means, occupancy sensor means, digital microcontroller means, and other electrical components associated therewith.

3. A low power leakage current type switching circuit as claimed in claim 2, wherein the switching circuit mounted on the single printed circuit board is mounted in a wall light switch single gang receptacle box for a room, the occupancy sensor means detects a human presence in the room, and the digital microcontroller means controls the delivery of electrical power to a lighting fixture means in the room.

4. A low power leakage current type switching circuit as claimed in claim 3, further including a current limiting means to restrict current flow through the rectifier means to less than 500 microamps.

5. A low power leakage current type switching circuit as claimed in claim 4, wherein the switching circuit is designed to be connected to an AC electrical power source from 120 VAC to 277 VAC.

6. A low power leakage current type switching circuit as claimed in claim 3, wherein the microcontroller means is operated at a very low clock frequency of approximately 32 to 33 kilohertz.

7. A low power leakage current type switching circuit as claimed in claim 3, wherein at least one potentiometer stores data for the microcontroller means by its resistance setting, thereby eliminating a requirement for an EEPROM to retain stored information during power outages.

8. A low power leakage current type switching circuit as claimed in claim 7, wherein first and second potentiometers store data respectively on a desired illumination light level for the room, and on a time duration between detected movements in the room by the occupancy sensor means.

9. A low power leakage current type switching circuit as claimed in claim 3, wherein the relay means comprises a low power bistable latching relay having a set coil and a reset coil, said storage capacitor means includes a first storage capacitor for storing electrical power for operating the set coil and a second storage capacitor for storing electrical power for operating the reset coil, and each of the set coil and the reset coil includes a relay drive operating circuit with an insulated gates field effect transistor.

10. A low power leakage current type switching circuit as claimed in claim 9, wherein each relay drive operating circuit includes a local ground for the relay coil drive, the current through which does not contribute to the leakage current from the hot lead to the ground connection at the AC electrical power input to the switching circuit.

11. A low power leakage current type switching circuit as claimed in claim 3, wherein a light emitting diode is flashed each time the occupancy sensor means detects a human presence in the room, a storage capacitor stores electrical energy for flashing the light emitting diode, and an operating circuit for flashing the light emitting diode includes an insulated gate field effect transistor.

12. A low power leakage current type switching circuit as claimed in claim 11, wherein the operating current for flashing the light emitting diode flows through a local ground, the current through which does not contribute to the leakage current from the hot lead to the ground connection at the AC electrical power input to the switching circuit.

13. A low power leakage current type switching circuit as claimed in claim 3, including a photosensor for detecting ambient light level in the room, and wherein the microcontroller means program inhibits energizing the lighting fixture means when the photosensor output indicates that the ambient light level in the room is above a set illumination level for the room.

14. A low power leakage current type switching circuit as claimed in claim 13, wherein the photocell exhibits a variable resistance in response to different illumination levels and is coupled to a resistor in a first voltage divider circuit, and a potentiometer stores data on the set illumination level for the room and is coupled to a resistor in a second voltage divider circuit, and a comparator compares the voltage outputs of the first and second voltage divider circuits, and the comparator output is directed to the microcontroller means.

15. A low power leakage current type switching circuit as claimed in claim 14, wherein the input voltage ranges to the comparator are maintained under one volt to maintain the photocell voltage divider current under 15 microamperes, which occurs under a maximum ambient light level condition.

16. A low power leakage current type switching circuit as claimed in claim 3, wherein the occupancy sensor means output signal is processed through an analog circuit which defines a window, having a minimum signal threshold and a maximum signal threshold, within which the output signal must pass to detect a human presence, and the microcontroller means program includes means for inhibiting all signals from the analog circuit window detector for a fixed time period after the relay means contacts to the load are opened to prevent triggering of the analog circuit as a result of transients produced thereby.

17. A low power leakage current type switching circuit as claimed in claim 16, wherein the fixed time period is in the range of one or two seconds to be short enough to be inconsequential to affect operation of the switching circuit and yet long enough to ensure that triggering transients have time to dissipate to a level within the window thresholds.

18. A low power leakage current type switching circuit as claimed in claim 3, further including a line voltage measuring circuit means, also coupled to the microcontroller, for continually monitoring the available AC power line voltage, and when a loss of AC line voltage is detected thereby, the microcontroller means program includes means for setting the relay means while sufficient energy remains in the storage capacitor means, such that when the AC line voltage is restored, the lighting fixture means is turned on.

19. A low power leakage current type switching circuit as claimed in claim 18, wherein after a loss of AC line voltage, the microcontroller means continues to periodically check the line voltage measuring circuit for continued loss of AC line voltage, and also clears delay timer registers to zero.

20. A low power leakage current type switching circuit as claimed in claim 3, wherein the relay means drive signal time durations are set to a value to assure proper relay energization and also to deplete the storage capacitor means voltage to a level where transients generated during turning off the relay means do not have a deleterious effect on the switching circuit.

21. A low power leakage current type switching circuit as claimed in claim 20, wherein the time duration of the relay means drive signals are in the range of 15 to 25 milliseconds.

22. A low power leakage current type switching circuit as claimed in claim 3, further including a selector switch which switches line voltage directly and has a first ON position in which current is supplied from the hot lead to the load, an OFF position in which no current is supplied from the hot lead to the load, and an AUTO position in which the first and second normally open contacts are closed under control of the microcontroller means to supply current from the hot lead to the load.

\* \* \* \* \*